(12) United States Patent
Clarke et al.

(10) Patent No.: US 9,427,087 B2
(45) Date of Patent: Aug. 30, 2016

(54) TRAVEL PILLOW

(71) Applicants: Victoria Clarke, Plano, TX (US);
Barbara Richter, Plano, TX (US)

(72) Inventors: Victoria Clarke, Plano, TX (US);
Barbara Richter, Plano, TX (US)

(*) Notice: Subject to any disclaimer, the term of this patent is extended or adjusted under 35 U.S.C. 154(b) by 0 days.

(21) Appl. No.: 13/939,180

(22) Filed: Jul. 11, 2013

(65) Prior Publication Data
US 2015/0013072 A1    Jan. 15, 2015

(51) Int. Cl.
*A47G 9/10* (2006.01)
*A47C 7/38* (2006.01)
*B60N 2/48* (2006.01)
*B60N 2/44* (2006.01)

(52) U.S. Cl.
CPC .............. *A47C 7/383* (2013.01); *B60N 2/4879* (2013.01); *B60N 2002/4405* (2013.01)

(58) Field of Classification Search
CPC ....................................................... A47G 9/10

USPC ..................................... 5/630, 636, 640, 657
See application file for complete search history.

(56) References Cited

U.S. PATENT DOCUMENTS

| | | | | |
|---|---|---|---|---|
| 3,327,330 A | * | 6/1967 | McCullough | 5/640 |
| 4,951,998 A | * | 8/1990 | McClain | 297/395 |
| 5,363,524 A | * | 11/1994 | Lang | 5/640 |
| 5,987,676 A | * | 11/1999 | Littleford | A47G 9/10 |
| | | | | 5/636 |
| 2012/0186016 A1 | * | 7/2012 | Martin | A47C 31/11 |
| | | | | 5/490 |

* cited by examiner

*Primary Examiner* — Fredrick Conley
(74) *Attorney, Agent, or Firm* — Blynn L. Shideler; Krisanne Shideler; BLK Law Group (57) ABSTRACT

The invention is a travel pillow constructed so a user can affix the pillow to a vehicle window or other smooth surface by using suction cups or any other location where a user may wish for a padded surface. The pillow is constructed so it is easily configured in multiple ways using magnets sewn within the cushions, constructed so the side cushions are thicker than its central cushions to provide a comfortable position for a user's head to rest.

8 Claims, 8 Drawing Sheets

TRAVEL PILLOW

TECHNICAL FIELD OF THE INVENTION

The present disclosure relates generally to small travel pillows used to support a user's head. Typically a user will be a passenger riding in an airplane, car, train or bus, or other vehicular transport, but the invention can also be used anywhere an individual would like a padded surface to rest her head.

BACKGROUND OF THE INVENTION

A wide variety of small travel pillows have been developed for passengers traveling in all types of vehicles, including but not limited to airplanes, cars, buses, and trains. Applicable prior art includes a) the U-shaped cushion that fits over a user's shoulders that is disclosed by U.S. Pat. No. 7,958,582; b) a U-shaped cushion that merely sits around a user's neck, as disclosed as U.S. Pat. No. 6,230,349; c) a collapsible head support section that is borne by two elongated rail members which run to the side of a user's head down the back of a user.

All of the aforementioned pillows depend on the user to maintain the pillow's position. If a user leans forward, the pillow also comes forward. The pillows lose position when a user moves. There are other travel pillows that are affixed in specific ways to plane seats, such as U.S. Pat. No. 5,860,177 that includes a support frame and adjustment mechanism so a user joins the pillow to the seat. These types of travel pillows are much more complex, and take considerable space. Because they are affixed to plane seats in a particular way, users can not position the pillow outside a small range of positions.

None of these pillows are capable of assisting a traveler who wishes to lean against the wall next to his seat, or can be oriented in more than a single direction.

The industry needs a pillow that can be configured to meet the changing needs of a traveler's comfort, whether she is seated near a wall or in an aisle seat, or simply desires more neck support versus head cushion, while traveling on an airplane, car, bus, train, or any other type of vehicle.

SUMMARY OF THE INVENTION

The present disclosure provides a versatile travel pillow that can be configured into multiple positions. The pillow also can be affixed to flat or magnetic surfaces in vehicles where an individual would like a padded surface to rest her head.

The pillow has a rectangular construction comprising several padded volumes attached together, constructed such that the two end cushion sections are thicker than the center sections. In the current embodiment, the center part of the pillow consists of three smaller pillow sections oriented perpendicular to the two end sections. This construction allows the pillow to be folded in multiple configurations while providing a comfortable surface.

The pillow is equipped with suction cups on one side that allows a user to attach the pillow to a smooth surface.

The pillow has magnets placed within it so a user can fold the pillow and by placing the fold so the magnets are in close proximity of each other, the pillow remains folded.

The pillow can be folded into thirds and stored in a small travel bag that can be placed inside other types of luggage, shoulder bags or carry-ons.

Optional small loops can be sewn into one or more sides of the pillow, onto which the suction cups can be hooked, allowing the pillow to be folded up, or to have a section of the pillow doubled up for the user's comfort.

Other features and advantages of the present disclosure will be apparent to those of ordinary skill in the art upon reference to the following detailed description taken in conjunction with the accompanying drawings.

BRIEF DESCRIPTION OF THE DRAWINGS

For a better understanding of the disclosure, and to show by way of example how the same may be carried into effect, reference is now made to the detailed description along with the accompanying figures in which corresponding numerals in the different figures refer to corresponding parts and in which.

The figures depict one possible embodiment for the purpose of explaining the invention. Obvious variants include loops on both ends, additional suction cups, additional magnets, and additional cushioned pads to make the pillow longer. The invention is currently 18×12", but the size of the pillow is not an inventive aspect and other sizes are certainly within the ambit of the disclosure.

DETAILED DESCRIPTION OF THE INVENTION

While the making and using of various embodiments of the present disclosure are discussed in detail below, it should be appreciated that the present disclosure provides many applicable inventive concepts, which can be embodied in a wide variety of specific contexts. The disclosure is primarily described and illustrated hereinafter in conjunction with various embodiments of the presently-described systems and methods. The specific embodiments discussed herein are, however, merely illustrative of specific ways to make and use the disclosure and do not limit the scope of the disclosure.

Figure 1:
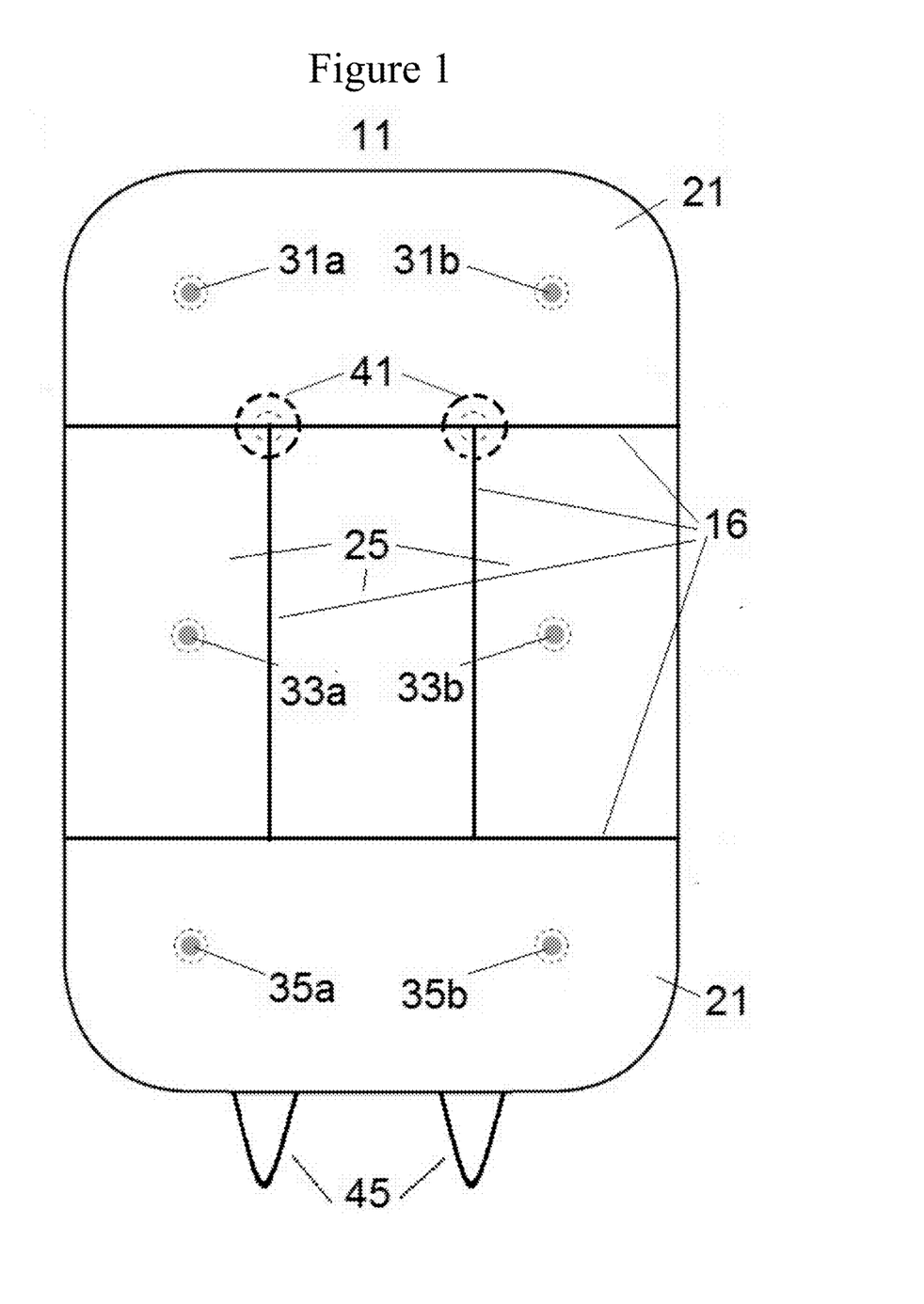
FIG. 1 depicts the front of one embodiment of the pillow oriented vertically.

FIG. 1 depicts a front view of one embodiment of the Pillow 11 oriented vertically. This embodiment includes two End Cushions 21, three Center Cushions 25, two transparent Suction Cups 41, three North Magnets 31a, 33a, 35b, three South Magnets 31b, 33b, 35a and Loops 45.

Cushion Stitching 16 denotes the separation of the multiple cushioned volumes as they are sewn together.

The five cushioned volumes are of two different thicknesses in the current embodiment with the two End Cushions 21 constructed to be thicker and more plush than the three Center Cushions 25.

This embodiment has more cushion in the End Cushions than the Center Cushions 25. This construction allows a user to lay his head on the central section comprising the less plush Center Cushions 25; the difference in thickness tends to keep the user's head in the center section when the pillow sits behind a user's head in a vehicle seat. This tendency is increased when the pillow is folded.

In the current embodiment, the six magnets are neodymium magnets sewn into the cushions and not visible. The North Magnets 31a, 33a, 35b are so named because they are oriented with their "north" magnetic end facing toward the side from which the Suction Cups 41 extend. The South Magnets 31b, 33b, 35a, are similarly named, with their "south" magnetic pole facing the side from which the Suction Cups 41 extend.

When a user is in a position to use the Pillow 11 in a metallic surrounding, the Magnets 31, 33, 35 can be employed to hold the Pillow 11 in place. The Suction Cups 45 can affix the Pillow 11 to a window or any smooth surface, and then the rest of the Pillow 11 can extend to a wall to block light from a user's eyes while the magnets hold the rest of the Pillow 11 in place against a metallic wall or seat part. The Pillow 11 can be folded even while it is held to a wall for additional comfort of the user.

The magnets can be installed in the opposite configuration; the desired configurations require that each magnet will attract its opposing magnet when the pillow is folded in half, e.g., North Magnet 31a and South Magnet 31b meet and help hold the pillow closed when it's folded. The other requirement is that the top two levels of magnets (magnet pairs 31 and 33) have matching polarities on each side, as the current embodiment, and that both of those have opposite polarity to the magnets on the bottom layer (magnet pair 35).

In the current embodiment, the polarity of the magnets are as described above. However, the Pillow 11 construction can hold the magnets in place with a simple pocket, in which a user could purposefully maneuver to change the polar position, or the construction could include ring-shaped magnets that are sewn into single polarity positions that are not user-changeable without resewing the magnets in place.

Figure 2:
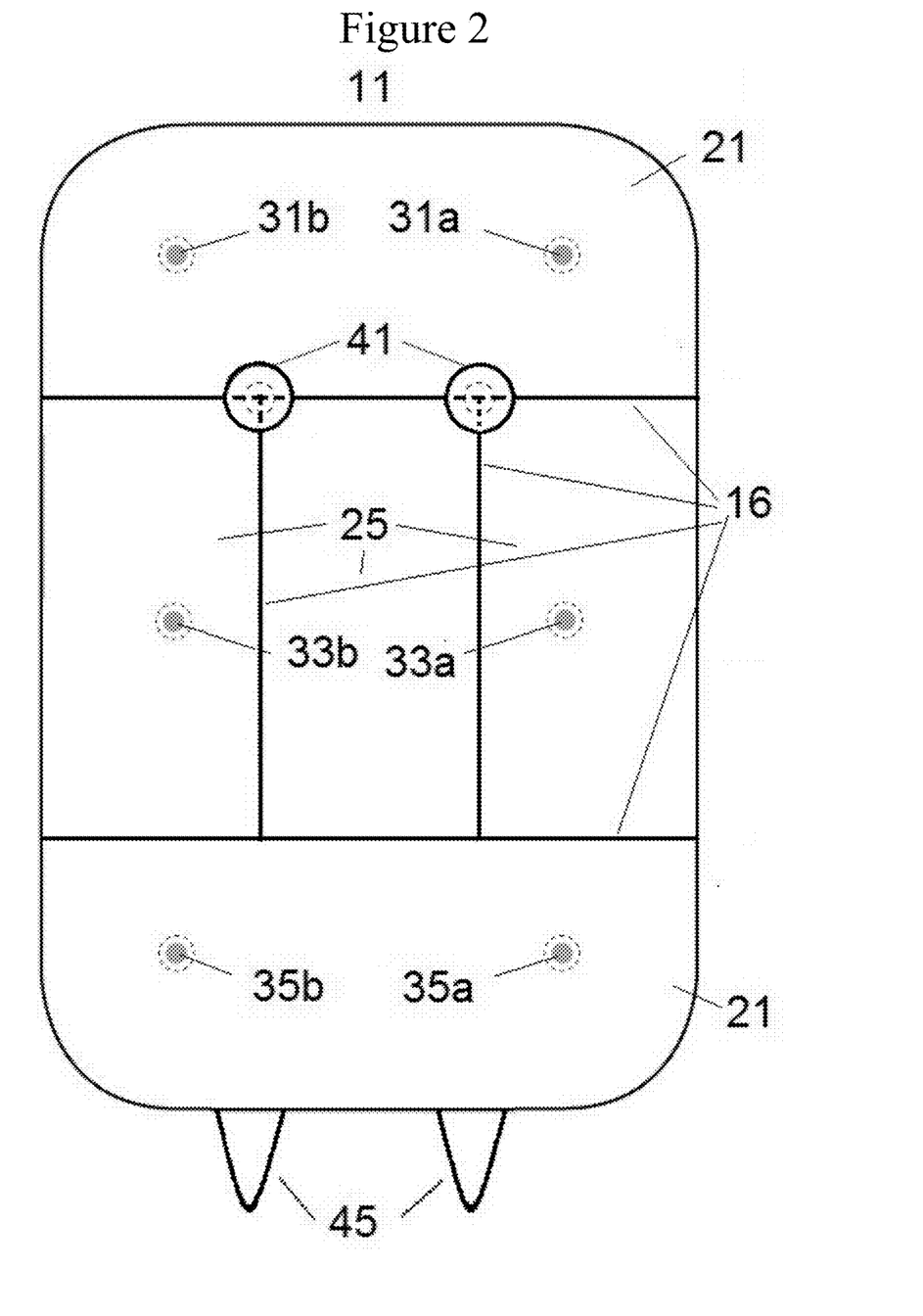
FIG. 2 depicts a rear view of the same embodiment as in FIG. 1.

The current embodiment employs transparent 1⅛" Suction Cups 41 sewn into the pillow along the seems as shown in FIGS. 1 and 2. The size, position, or number of suction cups is not a requirement—the pillow could just as easily use three cups aligned along the seam where the two cups are currently located. The pillow could also use additional cups along the lower seam or other locations on one side of the pillow.

The Suction Cups 41 allow a user to affix the Pillow 11 to a vehicle window or other smooth surface, and attach the pillow so it does not move from its location when a user moves his head.

The Suction Cups 41 also provide a convenient place for the optional Loops 45 to hang.

Figure 4:
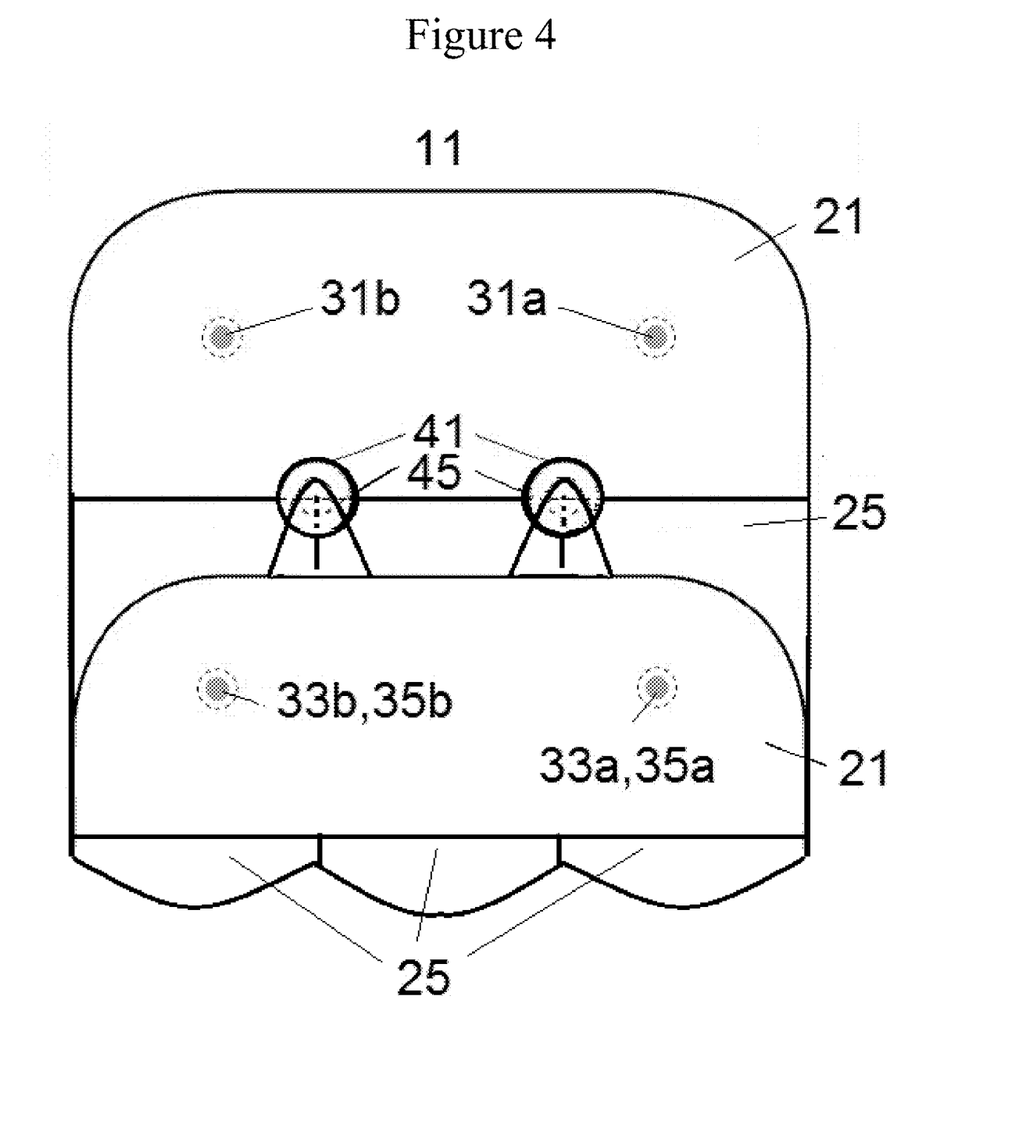
FIG. 4 depicts a rear view of the same embodiment of the invention as in the previous figures, configured to create a larger cushion in the lower portion of the invention.
Figure 5:
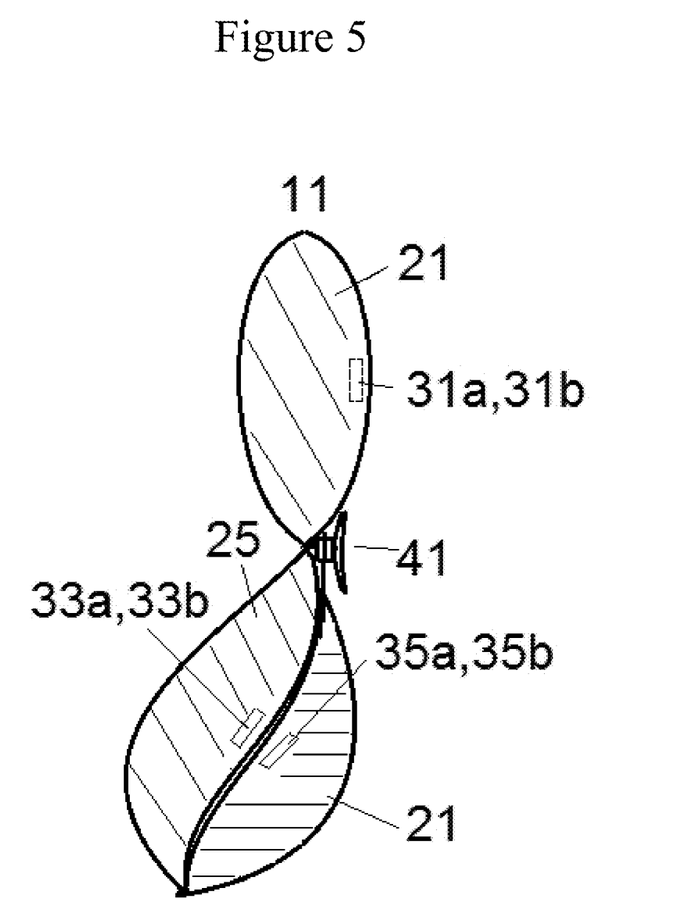
FIG. 5 is a side view of the invention as configured in FIG. 4.
Figure 6:
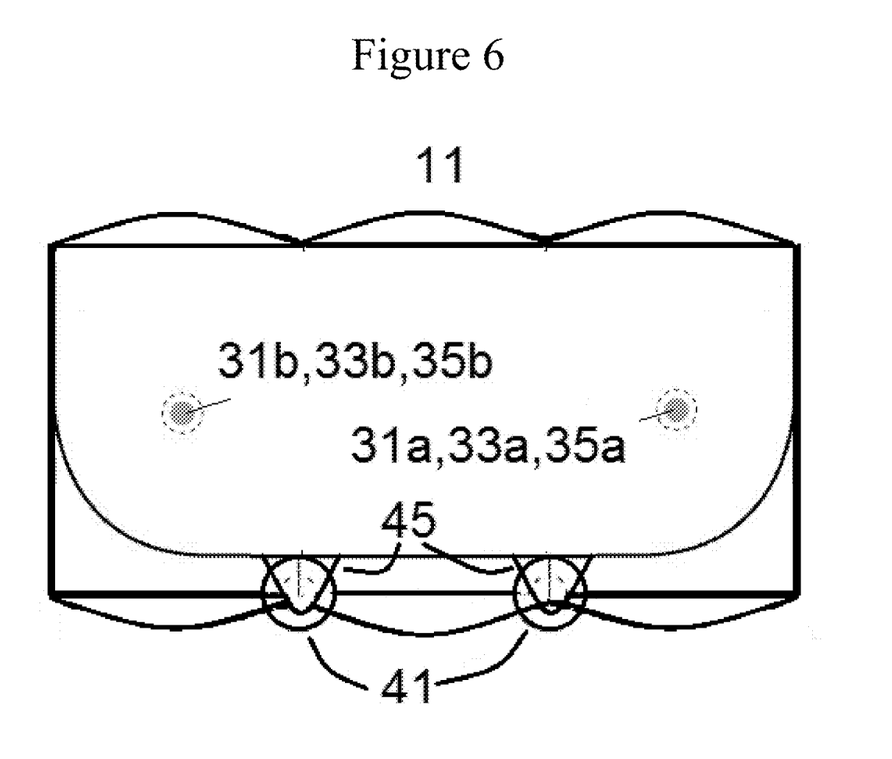
FIG. 6 is a view of the invention folded for travel.
Figure 7:
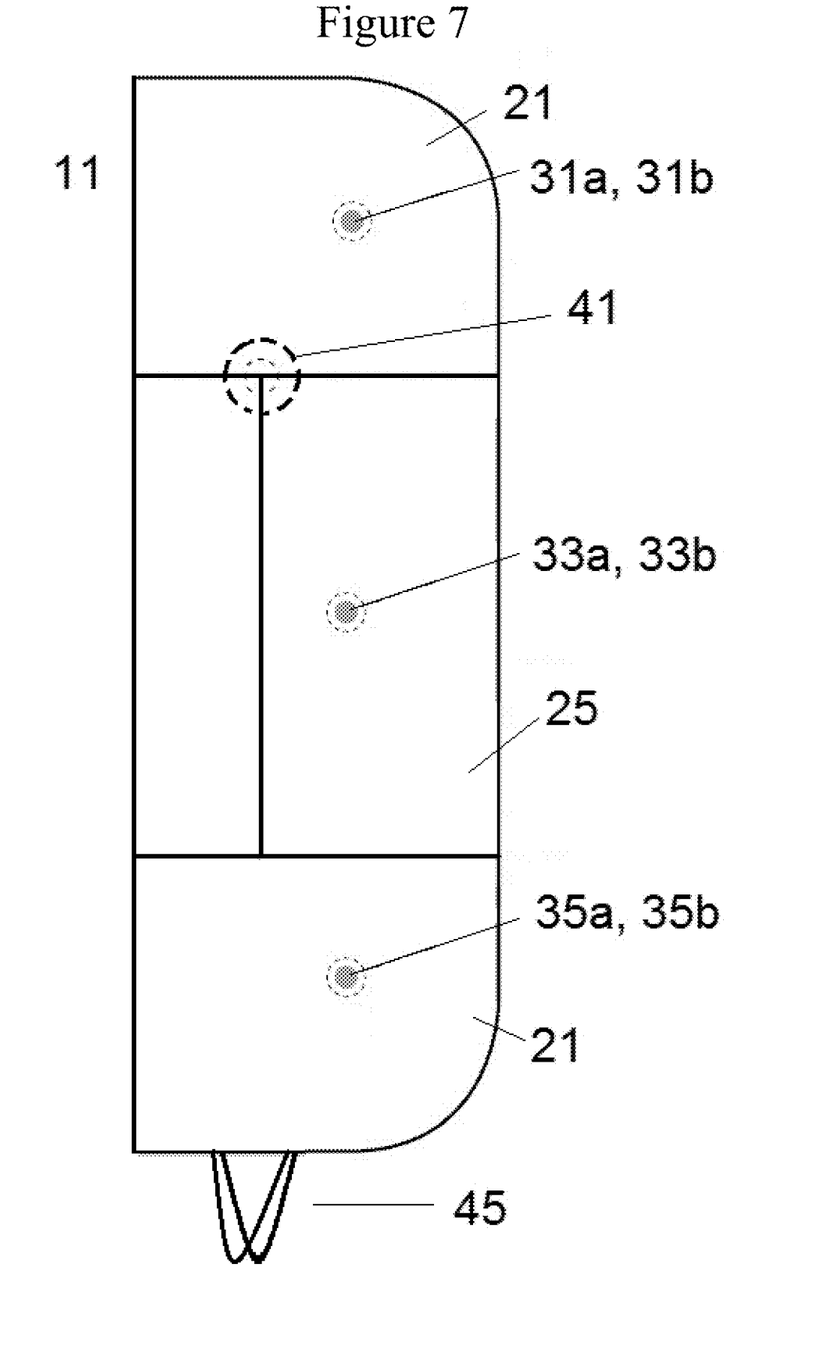
FIG. 7 is a front view of the invention configured to make the pillow support area thicker.

The optional Loops 45 are used to assist in making the Pillow 11 small enough to fit in a travel case, but can optionally be used as in FIG. 4, where the bottom of Pillow 11 is folded up and kept folded by the Loops 41 hung over the Suction Cups 41, creating a larger pillow cushion on which a user could rest his head with greater support than the flat pillow provides. The current embodiment does not require the optional Loops 41 to hook over the Suction Cups 45, so this is an optional construction.

Figure 3:
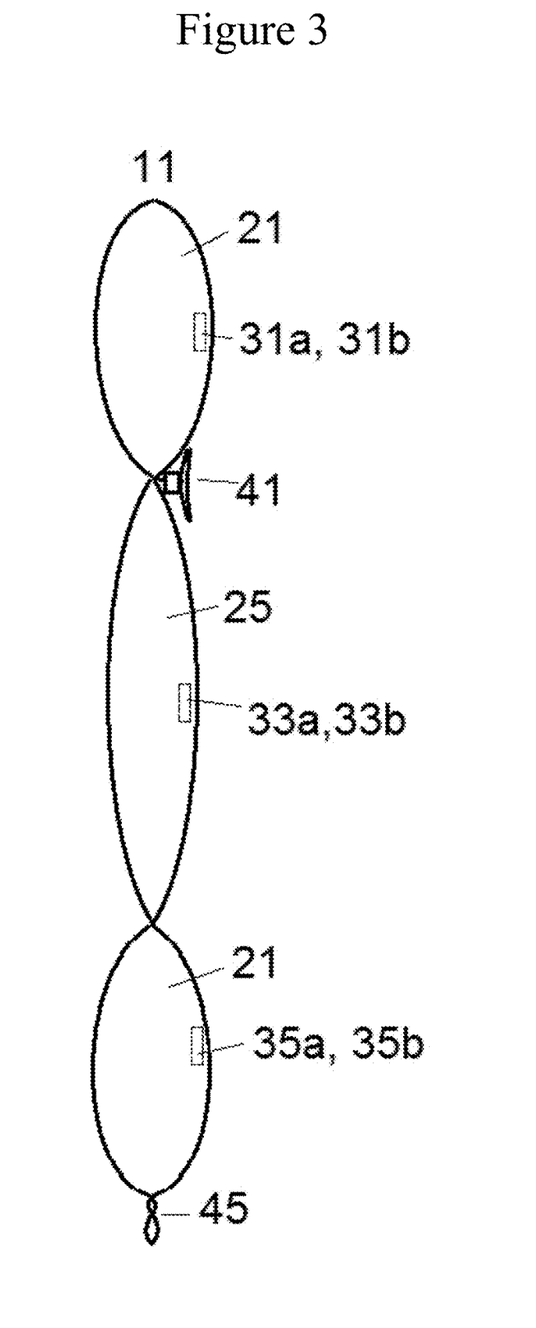
FIG. 3 depicts a side view of the embodiment of FIGS. 1 and 2.

The Pillow 11 can be folded lengthwise and the magnets placed together as shown in FIG. 3. This effectively doubles the Pillow's thickness, creating a higher barrier on either side of the user's head, and providing more support at the neck area, rather than behind the user's head. This configuration is suggested for users sitting in seats that are not near a wall, and where more side cushion is more desirable. A variant of this configuration occurs when a user snaps only the center row of magnets 33a and 33b together.

Figure 8:
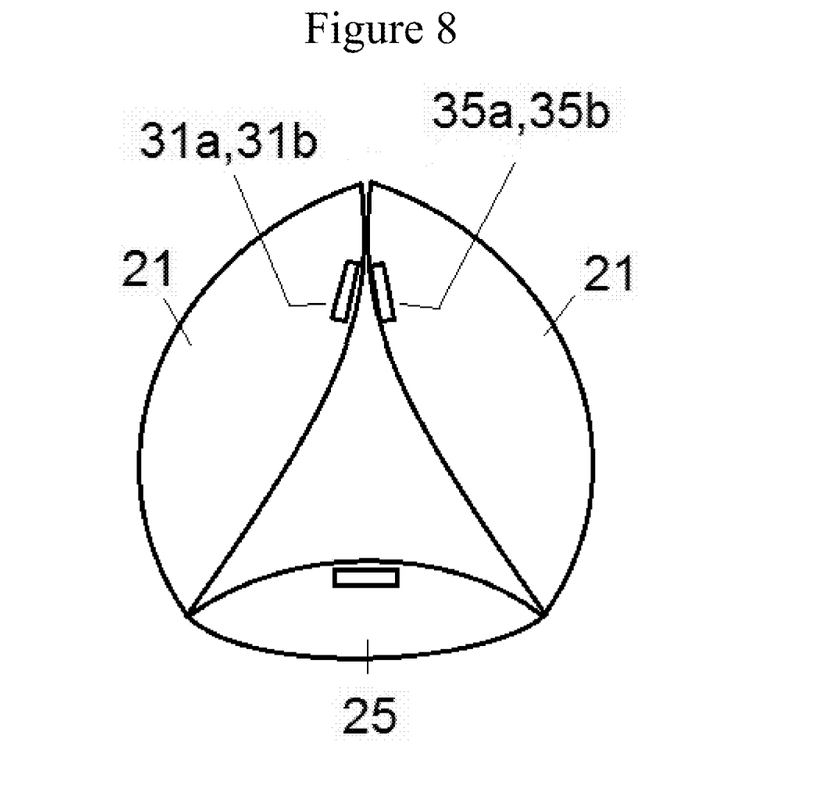
FIG. 8 is a side view of the invention with the pillow rolled into a triangular shape, held together by the top and bottom row of magnets. (The Suction Cups and optional Loops are not shown in this depiction.)

FIG. 8 depicts a side view of one embodiment with the pillow folded into a triangular configuration. In this configuration, the top row of Magnets 31a and 31b are placed against the bottom row of Magnets 35a and 35b by the user. The magnets then hold the pillow in a triangular shape.

The current embodiment is constructed with "silky minky" material, also known as "minky cuddle," but the material is not limited to such. Various materials can be used to fit the application. As the Pillow 11 has a multitude of ways in which it can be folded, and held together by the magnets inset in the Pillow's fabric, the foregoing explanation is not intended to cover all possibilities of this highly versatile pillow.

Similar embellishments, and various combinations thereof, are all comprehended by the present disclosure. In fact, all embodiments described herein are presented for purposes of illustration and explanation only. The specific compositions, configurations, orientations and operations of various features, portions and members may be provided in a number of ways in accordance with the present disclosure. The description as set forth is not intended to be exhaustive or to limit the disclosure to the precise form disclosed. Many modifications and variations are possible in light of the above teaching without departing from the spirit and scope of the claims which follow.

What is claimed is:

1. A travel pillow comprising:
   a plurality of upper cushion regions formed longitudinally along the travel pillow from a top end of the travel pillow, wherein each upper cushion region includes at least one pillow cushion including an outer peripheral cushion liner surrounding an inner cushion filling, and wherein each upper cushion region includes a pair of oppositely polarized magnets with one magnet on each side of a longitudinal centerline of the travel pillow, and wherein each of the upper cushion region magnets on each side of longitudinal centerline of the travel pillow have the same polarity; and
   a lower cushion region formed at a bottom end of the travel pillow and coupled to a lowermost upper cushion region, wherein the lower cushion region includes at least one pillow cushion including an outer peripheral cushion liner surrounding an inner cushion filling, and wherein the lower cushion region includes a pair of oppositely polarized magnets with one magnet on each side of the longitudinal centerline of the travel pillow, and wherein each magnet of the lower cushion region has an opposite polarity from the upper cushion region magnets on the same side of longitudinal centerline of the travel pillow, whereby the travel pillow accommodates multiple reconfigurations including a reconfiguration in which each magnet pair of each cushion region are magnetically coupled together and a plurality of reconfigurations in which the pair of lower cushion region magnets are magnetically coupled to one of the pairs of magnets in one of the upper cushion regions.

2. The travel pillow according to claim 1 further including at least one suction cup coupled to the travel pillow.

3. The travel pillow according to claim 2 wherein the top most upper cushion region and the lower cushion region are formed of a single rectangular pillow cushion extending across the width of the travel pillow.

4. The travel pillow according to claim 3 wherein the single rectangular pillow cushions of the top most upper cushion region and of the lower cushion region are coupled to cushions of a longitudinally adjacent cushion region via a lateral seam extending across the width of the travel pillow.

5. The travel pillow according to claim 4 wherein each suction cup is coupled to the travel pillow at one of the lateral seams extending across the width of the travel pillow.

6. The travel pillow according to claim 5 wherein an upper cushion region longitudinally adjacent the top most upper cushion region includes at least three generally rectangular longitudinally extending pillow cushions with a longitudinal seam connecting each longitudinally extending pillow cushion to at least one adjacent longitudinally extending pillow cushion.

7. The travel pillow according to claim 6 wherein a plurality of suction cups are coupled to the travel pillow, each suction cup coupled at an intersection of one of the longitudinal seams and one of the lateral seams.

8. The travel pillow according to claim 7 wherein a greatest thickness of the end rectangular pillow cushions measured perpendicular to the centerline and to the lateral seams is greater than the greatest thickness of each of the rectangular longitudinally extending cushions of the intermediate region.

\* \* \* \* \*